(12) United States Patent
Akahori

(10) Patent No.: US 9,286,702 B2
(45) Date of Patent: Mar. 15, 2016

(54) RADIOGRAPHIC IMAGING SYSTEM

(75) Inventor: Sadato Akahori, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 718 days.

(21) Appl. No.: 13/523,543

(22) Filed: Jun. 14, 2012

(65) Prior Publication Data

US 2012/0321163 A1 Dec. 20, 2012

(30) Foreign Application Priority Data

Jun. 15, 2011 (JP) ................... 2011-132955
Jul. 5, 2011 (JP) ................... 2011-149411
Jun. 7, 2012 (JP) ................... 2012-129947

(51) Int. Cl.
*G06K 9/00* (2006.01)
*G06T 11/00* (2006.01)

(52) U.S. Cl.
CPC .......... *G06T 11/006* (2013.01); *G06T 2211/421* (2013.01); *G06T 2211/436* (2013.01)

(58) Field of Classification Search
None
See application file for complete search history.

(56) References Cited

U.S. PATENT DOCUMENTS

| | | | |
|---|---|---|---|
| 4,903,204 A * | 2/1990 | Dobbins, III | 382/255 |
| 5,359,513 A | 10/1994 | Kano et al. | |
| 5,467,404 A | 11/1995 | Vuylsteke et al. | |
| 5,991,457 A * | 11/1999 | Ito et al. | 382/254 |
| 6,442,288 B1 | 8/2002 | Haerer et al. | |
| 6,751,284 B1 | 6/2004 | Claus et al. | |
| 2006/0204076 A1 | 9/2006 | Avinash et al. | |

FOREIGN PATENT DOCUMENTS

| | | | |
|---|---|---|---|
| JP | 55-087953 A | 7/1980 |
| JP | 55-163472 A | 12/1980 |
| JP | 03-276265 A | 12/1991 |
| JP | 05-049631 A | 3/1993 |
| JP | 7-37074 A | 2/1995 |
| JP | 1075395 A | 3/1998 |
| JP | 10105701 A | 4/1998 |

(Continued)

OTHER PUBLICATIONS

Notification of Reasons for Refusal, dated Apr. 30, 2013, issued in corresponding JP Application No. 2012-129947, 6 pages in English and Japanese.

(Continued)

*Primary Examiner* — Andrew Moyer
(74) *Attorney, Agent, or Firm* — Sughrue Mion, PLLC

(57) ABSTRACT

A radiographic imaging system is adapted to reconstruct a tomographic image in a given cross section of a subject from projection images of a subject acquired in tomosynthesis imaging. The radiographic imaging system comprises a frequency filtering processor for producing band limiting image signals having different frequency response characteristics from projection image signals corresponding to the projection images; a non-linear conversion processor for performing non-linear conversion of band limiting image signals to reduce a portion of band limiting image signals exceeding a given value; an integration processor for adding up band limiting image signals having undergone non-linear conversion through the non-linear conversion processor to produce converted image signals; and a back projection processor for reconstructing the tomographic image in the given cross section of the subject from the converted image signals corresponding to the projection images.

16 Claims, 9 Drawing Sheets

(56) References Cited

FOREIGN PATENT DOCUMENTS

| JP | 10295680 A | 11/1998 |
| JP | 2004073449 A | 3/2004 |
| JP | 2004181243 A | 7/2004 |
| JP | 2005052295 A | 3/2005 |
| JP | 3816151 B2 | 8/2006 |
| JP | 2006239420 A | 9/2006 |
| JP | 2008245999 A | 10/2008 |
| WO | 2008/002633 A2 | 1/2008 |

OTHER PUBLICATIONS

Communication, dated Sep. 19, 2012, issued in corresponding EP Application No. 12172019.7, 6 pages.
Communication, dated Feb. 12, 2014, issued in corresponding JP Application No. 2012-129947, 6 pages in English and Japanese.

* cited by examiner

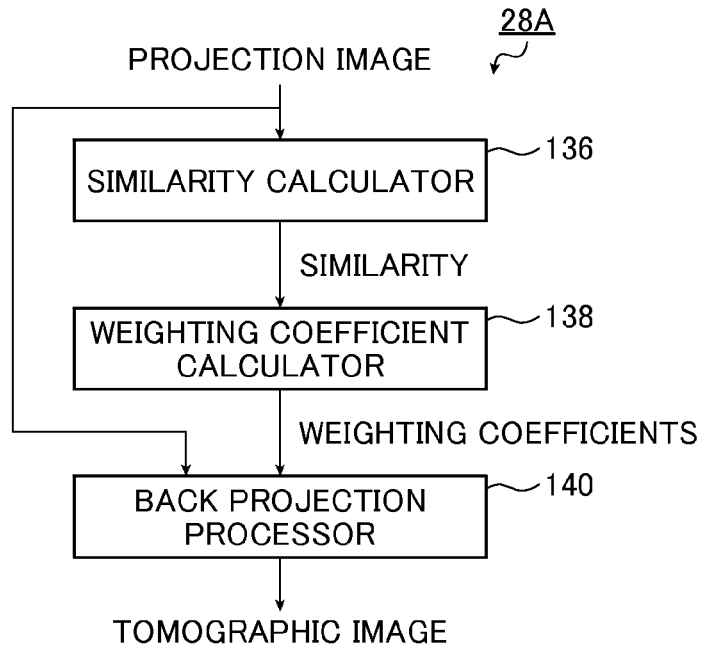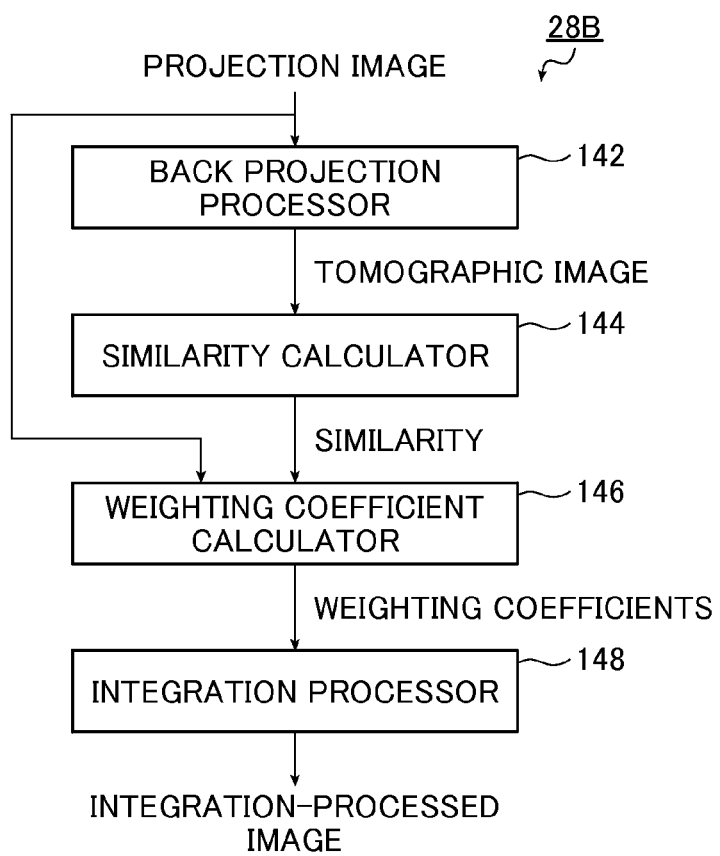

RADIOGRAPHIC IMAGING SYSTEM

BACKGROUND OF THE INVENTION

The present invention relates to a radiographic imaging system whereby a plurality of projection images (radiographic images) are acquired by tomosynthesis imaging to reconstruct a tomographic image of a subject in a given cross section from the acquired projection images.

In tomosynthesis imaging, a radiation source is moved in one direction, for example, as the subject is irradiated from different angles, and a radiation detector detects the radiation having passed through the subject to successively acquire a series of projection images taken from different angles. Subsequently, the acquired projection images are shifted and the pixels are superimposed so as to be in alignment for a structure of interest, thereby reconstructing a tomographic image in a given cross section of the subject.

Tomosynthesis imaging uses the fact that structures overlie over each other differently among projection images depending on the imaging angle and shifts and adds up the projection images appropriately as described above to obtain an image (tomographic image) where a structure of interest in a desired tomographic plane is enhanced.

However, in tomosynthesis, the range of the imaging angle is so limited as to reduce the separation ability in the depth direction. This may cause a problem of an artifact produced in a reconstructed tomographic image by an effect of another structure than the structure of interest.

JP 5-49631 A, prior art literature that may be related to the present invention, describes dividing an image into small regions each having 4×6 pixels and calculating the similarity between two images in each of the small regions in order to measure the amount of movement from a subject represented in two images. JP 7-37074 A describes using the normalized cross-correlation method to determine a sub-region in search area having a high similarity to image data in the template.

To enhance diagnosis performance of a reconstructed tomographic image, use of image processing has been proposed including frequency enhancement for enhancing a high frequency component and frequency suppression for suppressing a low frequency component as exemplified by a flow image contained in a tomographic image (JP 3816151 B).

Frequency enhancement is a processing whereby an unsharp mask signal of an unsharp mask image (average image of a tomographic image) is subtracted from the image signal of a tomographic image to produce an image signal of a frequency image containing a high frequency component, and the frequency image signal is multiplied by an enhancement coefficient to enhance the high frequency component and added to the image signal of the tomographic image (JP 55-163472 A and JP 55-87953 A). Thus, the high frequency component in a tomographic image is enhanced.

The flow image is an obstruction shadow occurring in a tomographic image as an image of a portion where the dose of transmitted radiation existing elsewhere than in a focused cross section to be imaged greatly changed is produced along the direction in which the radiation source moves (JP 3-276265 A). The frequency suppression processing removes a low frequency component corresponding to, for example, a flow image in a reconstructed tomographic image, to produce an image from which the flow image, for example, has been removed.

To enable image processing such as frequency enhancement and frequency suppression, there is known a filtered back-projection method for performing filter correction as a tomographic image is reconstructed. For the filter correction, general use is made of, for example, a lamp filter having filter characteristics to perform linear conversion as shown in FIG. 17A or a filter obtained by multiplying that lamp filter by a window function such as Hanning window as shown in FIG. 17B.

The filter correction is typically implemented with a linear filter having high frequency enhancing characteristics and hence may develop an overshoot or an undershoot in the periphery of, for example, a metal, or an enhanced noise component because of an excessively enhanced high-contrast signal, possibly leading to occurrence of an artifact in the tomographic image. As an alternative method of reconstruction in tomosynthesis is also known a successive approximation method exemplified by algebraic reconstruction method but such method is prone to increased computation time.

SUMMARY OF THE INVENTION

A first object of the present invention is to provide a radiographic imaging system capable of performing filter correction permitting no artifact to occur even in a high-contrast area of a tomographic image without allowing the computation time to increase.

A second object of the present invention is to provide a radiographic imaging system capable of preventing occurrence of an artifact due to an effect of a structure other than a structure of interest in a reconstructed tomographic image in addition to the above first object.

In order to achieve the above object, the present invention provides a radiographic imaging system for reconstructing a tomographic image in a given cross section of a subject from projection images of a subject acquired in tomosynthesis imaging, the radiographic imaging system comprising:

a frequency filtering processor for producing band limiting image signals having different frequency response characteristics from projection image signals corresponding to the projection images;

a non-linear conversion processor for performing non-linear conversion of band limiting image signals to reduce a portion of band limiting image signals exceeding a first given value;

an integration processor for adding up band limiting image signals having undergone non-linear conversion through the non-linear conversion processor to produce converted image signals; and a back projection processor for reconstructing the tomographic image in the given cross section of the subject from the converted image signals corresponding to the projection images.

The present invention enables, without increasing the computation time, suppression of occurrence of an artifact in a tomographic image resulting from an excessive enhancement of an area that is in itself of a high contrast such as a metal and enhancement of a noise component.

According to the present invention, wherein pixel values are weighted according to the similarity between projection images, a structure of interest in a reconstructed tomographic image can be enhanced, and occurrence of an artifact due to an effect of a structure other than a structure of interest in a reconstructed tomographic image can be prevented.

BRIEF DESCRIPTION OF THE DRAWINGS

FIG. 3 is a block diagram of an embodiment representing a configuration of an image processor of a radiographic imaging system according to the first aspect.

FIG. 7 is a block diagram of an embodiment representing a configuration of an image processor of a radiographic imaging system according to the second aspect.

DETAILED DESCRIPTION OF THE INVENTION

Figure 1:
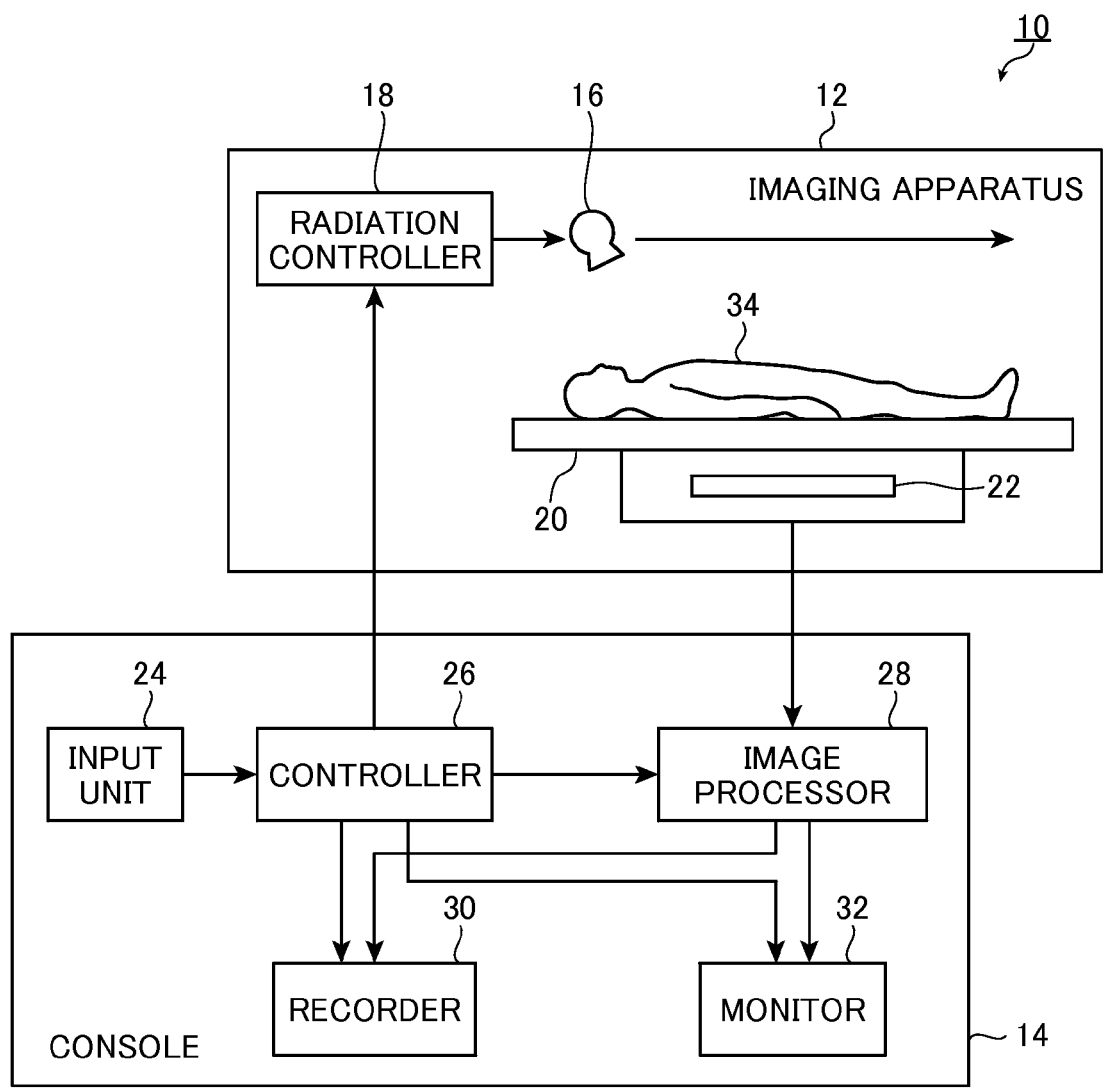
FIG. 1 is a block diagram of an embodiment representing a configuration of a radiographic imaging system according to the invention.

These and other objects, features, and advantages of the present invention will be apparent from the following detailed description and accompanying drawings in which:

FIG. 1 is a block diagram of an embodiment representing a configuration of a radiographic imaging system according to the invention. A radiographic imaging system 10 illustrated in that figure images a subject 34 in tomosynthesis to acquire a plurality of projection images (radiographic images) taken at different imaging angles and reconstructs a tomographic image in a cross section at a given height of the subject 34 from the acquired projection images. The radiographic imaging system 10 comprises an imaging apparatus 12 and a console 14.

The imaging apparatus 12 images the subject 34 in tomosynthesis to acquire a plurality of projection images taken at different imaging angles and comprises a radiation source 16, a radiation controller 18, and an imaging table 20.

Under the control of the radiation controller 18, the radiation source 16 emits radiation having a given intensity for a given time period for acquisition of projection images of the subject 34. That is, the radiation source 16 radiates a given dose of radiation.

Under the control of a controller 26 of the console 14 described later, the radiation controller 18 controls the operation of the radiation source 16 such as ON/OFF control of irradiation and setting of the irradiation position/angle according to imaging conditions.

The imaging table 20 shown is a lying-position imaging table and used to position the subject 34 for acquisition of projection images. The imaging table 20 may alternatively be a standing-position imaging table. Beneath the imaging table 20 is provided a radiation detector 22.

The radiation detector 22, which may be, for example, a flat panel type (FPD: flat panel detector), detects the radiation emitted from the radiation source 16 and transmitted through the subject 34 and outputs image signals (image data) of projection images of the subject 34.

The console 14 controls the operation of the whole radiographic imaging system 10 and comprises an input unit 24, the controller 26, an image processor 28, a recorder 30, and a monitor 32.

The input unit 24, exemplified by a keyboard or a mouse, is provided to enter, for example, instructions such as imaging instruction and information such as imaging conditions.

The controller 26 controls the radiation controller 18, the image processor 28, the recorder 30, and the monitor 32 according to instructions and information entered through the input unit 24.

Under the control of the controller 26, the image processor 28 performs various image processing including image synthesis and filter correction of projection images (the image signal thereof) entered from the radiation detector 22, reconstructs a tomographic image (the image signal thereof) in a cross section at a given height of the subject 34, and outputs the reconstructed tomographic image.

Under the control of the controller 26, the recorder 30 records information including, for example, a tomographic image (the image signal thereof) outputted from the image processor 28; the recorder 30 may be, for example, a hard disk, a CD-R, a DVD-R, or a printer.

Under the control of the controller 26, the monitor 32, exemplified by a liquid crystal display, displays information including, for example, a tomographic image outputted from the image processor 28.

Next, the operation of the radiographic imaging system 10 in tomosynthesis imaging will be described.

For tomosynthesis imaging by the radiographic imaging system 10, the subject 34 is positioned on the imaging table 20. Then, upon an instruction to start imaging being given from the input unit 24, tomosynthesis imaging is started under the control of the controller 26.

Upon start of imaging, the imaging apparatus 12 irradiates the subject 34 from different angles as the radiation source 16 is moved in one direction with the irradiation angle of the radiation source 16 changed so as to be directed toward the subject 34 under the control of the radiation controller 18 to acquire projection images sequentially taken at different imaging angles in a single imaging operation. Whenever a projection image of the subject 34 is acquired, the radiation detector 22 outputs an image signal of the acquired projection image.

In the console 14, the image signals of projection images entered from the imaging apparatus 12 are sequentially stored in the recorder 30 under the control of the controller 26.

Upon completion of imaging, various image processings are performed under the control of the controller 26, including filter correction and image synthesis for aligning and superimposing the projection images over each other to reconstruct a tomographic image in a given cross section of the subject 34 from the image signals of the projection images taken at different imaging angles and stored in the recorder 30. The reconstructed tomographic image is displayed on the monitor 32 and the image signal thereof is recorded where necessary in the recorder 30.

The operation of the reconstruction of the tomographic image is described below.

For reconstruction of a tomographic image is typically used the shift-and-add method. By the shift-and-add method, the positions of the acquired projection images are sequentially shifted and the corresponding pixels are added so that the position of a structure of interest is in alignment based on the positions where the radiation source 16 is located when the respective projection images are acquired.

Figure 2A:
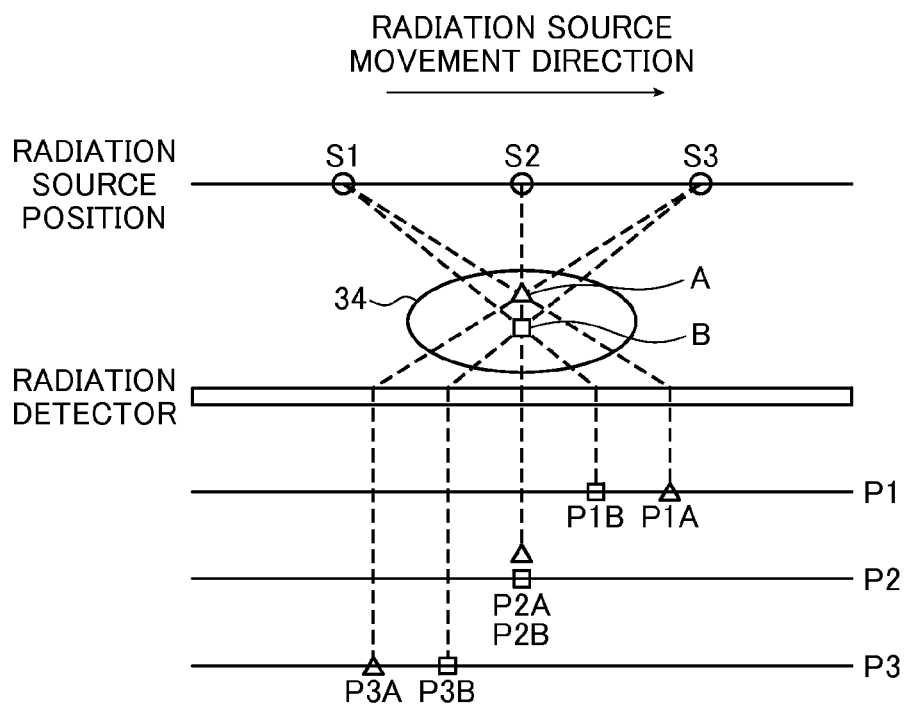
FIGS. 2A and 2B are conceptual views of an example illustrating reconstruction of a tomographic image in tomosynthesis imaging.
Figure 2B:
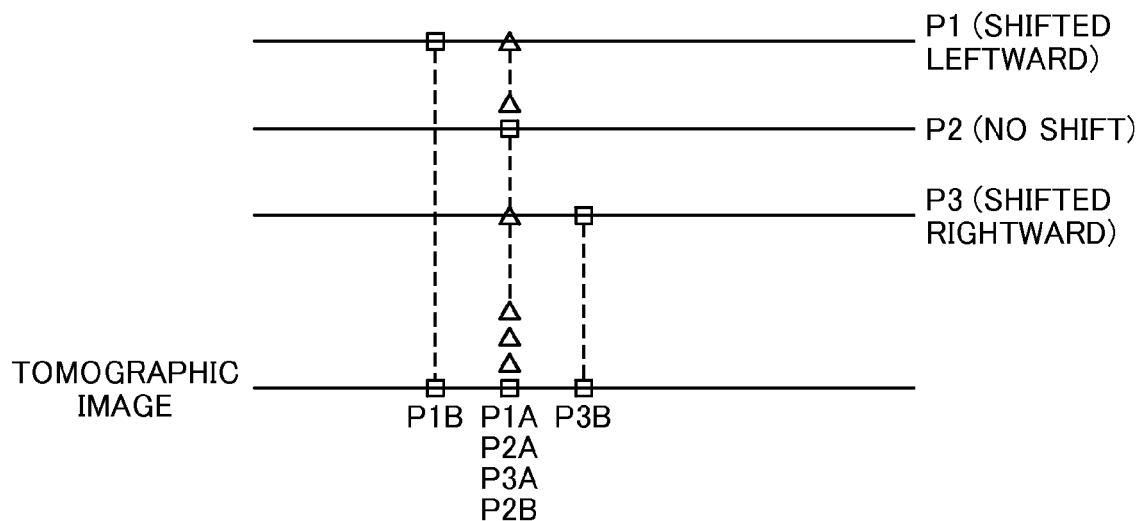

FIGS. 2A and 2B are conceptual views of an example illustrating reconstruction of a tomographic image in tomosynthesis. As illustrated in FIG. 2A, the radiation source 16 starts at position S1 and moves to S3 in tomosynthesis imaging, emitting radiation to the subject 34 at radiation source positions S1, S2, and S3 to acquire radiographic images P1, P2, and P3 of the subject 34.

Suppose that there are two structures A and B to be imaged at two positions of the subject 34 having different heights as illustrated in FIG. 2A. The radiation emitted from the radiation source 16 at imaging positions S1, S2, and S3 (positions of the radiation source 16 at which image acquisition is made) is transmitted through the subject 34 and admitted into the radiation detector 22. As a result, the two structures A and B are projected in different positional relations among the projection images P1, P2, and P3 each corresponding to the imaging positions S1, S2, and S3.

In the projection image P1, for example, the position S1 of the radiation source 16 is located to the left of the structures A, B with respect to the moving direction of the radiation source 16, so that the structures A, B are projected to positions P1A and P1B that are shifted to the right of the structures A, B. Likewise, in the projection image P2, the structures are projected in positions P2A, P2B that are substantially directly beneath the structures A, B; in the projection image P3, the structures are projected in positions P3A, P3B that are shifted to the left.

To reconstruct a tomographic image in a cross section at a height of the structure A, the projection image P1 is shifted leftward, and the projection image P3 is shifted rightward, for example, according to the position of the radiation source 16, so that the projection positions P1A, P2A, and P3A of the structure A of interest coincide as illustrated in FIG. 2B to synthesize the corresponding pixels. Thus, the tomographic image at the height of the structure of interest A is reconstructed. A tomographic image in a cross section at any height can be likewise reconstructed.

Next, the image processing for reconstructing a tomographic image performed in the image processor 28 is described.

FIG. 3 is a block diagram of an embodiment representing a configuration of an image processor of a radiographic imaging system according to the first aspect. An image processor 28A illustrated in FIG. 3 comprises a similarity calculator 136, a weighting coefficient calculator 138, and a back projection processor 140.

The similarity calculator 136 uses one of the projection images acquired by tomosynthesis imaging, say a projection image projected from the front of the subject, as reference projection image to calculate the similarity (or dispersity) by normalized cross-correlation function between a given region near pixels of the reference projection image (an M×N pixel region containing pixels of interest) and given regions near the corresponding pixels of the individual projection images cumulatively added to the same position in the tomographic image.

The weighting coefficient calculator 138 calculates weighting coefficients that increase with the similarity for the pixels of the individual projection images. The weighting coefficient calculator 138 may use the similarity per se as weighting coefficients.

The back projection processor 140 cumulatively adds up the products of the pixel values of the pixels of projection images cumulatively added to the same position in the tomographic image and the corresponding weighting coefficients to reconstruct a tomographic image.

In the reconstruction of the tomographic image, the image processor 28A weights and adds up the pixel values of the corresponding pixels of the tomographic image according to the similarity (correlation) between the given region near a pixel in the reference projection image and the given regions near the corresponding pixel in the individual projection images, cumulatively added to the same position in the tomographic image to selectively enhance a structure of interest in a focused cross section (lessen a structure in cross sections other than the focused cross section).

Figure 4:
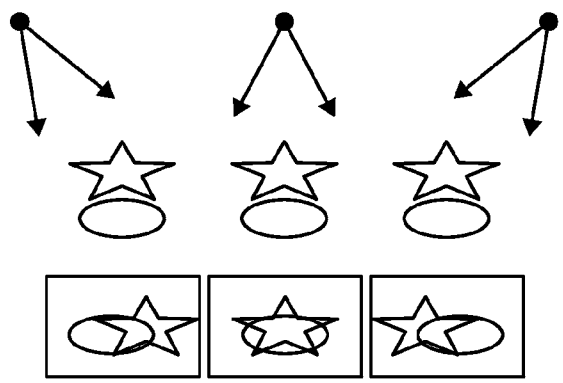
FIG. 4 is a conceptual view of an example representing a positional relation between structures imaged in tomosynthesis and structures represented in projection images.

With reference to FIG. 4, suppose that a plurality of (three in the example of FIG. 4) projection images of a subject containing structures of interest including a stellate structure and a circular structure are acquired.

Figure 6:
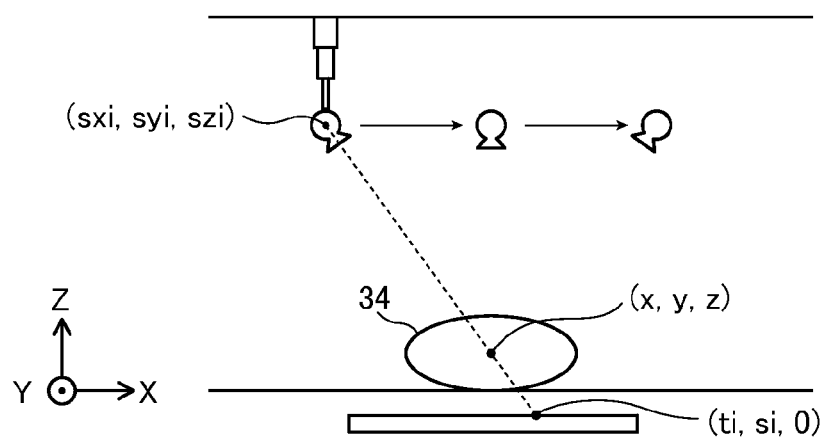
FIG. 6 is a conceptual view of an example representing a relation between the position of a structure, the position of a radiation source, and the projection position in a projection image.

A pixel value Tz(x,y) of each pixel of a tomographic image Tz reconstructed by a conventional reconstruction method is expressed by the following formula where, as illustrated in FIG. 6, (x,y,z) is the coordinates of a structure of interest in a given cross section of the subject 34, (sxi,syi,szi) the position where the radiation source is located when individual projection images are acquired, (ti,si,0) the projection position of the structure of interest in an ith projection image Pi (i is an integer from −I to I; P0 is the projection image taken from the front of the subject 34), and Pi(ti,si) the pixel value of the pixels of the projection image Pi.

$$Tz(x, y) = \sum_{i=-I}^{I} Pi(ti, si)$$
$$= \sum_{i=-I}^{I} Pi\left(x * \frac{szi}{szi-z} - sxi * \frac{z}{szi-z}, y * \frac{szi}{szi-z} - syi * \frac{z}{szi-z}\right)$$

Figure 5:
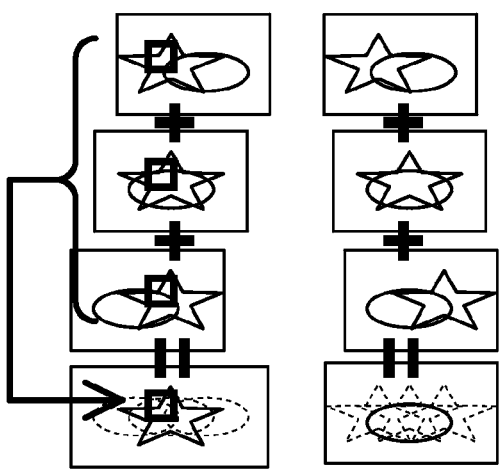
FIG. 5 is a conceptual view of an example representing reconstruction of a tomographic image.

Through the above computation, the pixel information of radiation transmitted through the point (x,y,z) in space in each projection image Pi is cumulatively added to the pixel value Tz(x,y) of the corresponding pixel in the tomographic image Tz, so that the tomographic image Tz where the point (x,y,z) is enhanced can be obtained. Suppose, for example, that the point (x,y,z) is a point on the stellate structure illustrated in FIG. 5. The projection information on the corresponding pixels of the projection images Pi superimpose over each other, so that the tomographic image Tz where the stellate structure is enhanced can be obtained.

The pixel value Tz(x,y) of the pixels of the tomographic image Tz reconstructed by the back projection processor 140 of the image processor 28A is expressed by the following formula where wi(ti,si) are the weighting coefficients for the pixels (ti,si) in the projection images Pi.

$$Tz(x, y) = \sum_{i=-I}^{I} wi(ti, si) * Pi(ti, si)$$

The image processor 28A calculates the weighting coefficients wi(ti,si) as follows.

First, using, among a plurality of projection images Pi, a projection image P0 projected from the front of the subject 34 as reference projection image P0, the similarity calculator 136 calculates the similarity, using the normalized cross-correlation, between a rectangular region near the projection position P0(t0,s0) of the pixel in the reference projection image P0 and a rectangular region near the projection position Pi(ti,si) of the corresponding pixel in the projection images Pi cumulatively added to the same position in the tomographic image Tz.

The weighting coefficient calculator 138 calculates the weighting coefficients wi(ti,si) that increases with the similarity for the pixels of the individual projection images. Due to normalized autocorrelation, weighting coefficients w0(t0, s0) for the reference projection image P0 is "1".

Weighting with the weighting coefficients wi has an effect of changing the contribution to the pixel value Tz(x,y) according to the similarity between the corresponding rectangular regions of the projection images Pi cumulatively added to the pixel value Tz(x,y) of the pixels of the tomographic image Tz. This makes it possible to enhance a structure of interest and prevent occurrence of an artifact due to an effect of another structure than the structure of interest in the reconstructed tomographic image Tz.

The similarity calculator 136 may be adapted to calculate the similarity not between given regions but between the pixel at the projection position P0(t0,s0) in the reference projection image P0 and the pixels at the projection position Pi(ti,si) in the projection images Pi cumulatively added to the same position in the tomographic image Tz. Using the projection image taken from the front of the subject as reference projection image is not essential; one of the projection images Pi may be used as reference projection image.

The similarity calculator 136 need not necessarily obtain the similarity between given regions or pixels of two projection images from the normalized cross-correlation and may calculate the similarity by any of various template matching (pattern matching) methods.

Although the image processor 28A weights the pixels of projection images before reconstructing a tomographic image, the invention is not limited thereto; the same effect may be obtained by weighting the pixels of the reconstructed tomographic image. Now, the above case will be described.

FIG. 7 is a block diagram of an embodiment representing a configuration of an image processor according to the second aspect. An image processor 28B illustrated in FIG. 7 comprises a back projection processor 142, a similarity calculator 144, a weighting coefficient calculator 146, and a multiplication processor 148.

The back projection processor 142 reconstructs a tomographic image from a plurality of projection images.

The similarity calculator 144 calculates the similarity between given regions (an M×N pixel region containing a pixel of interest) near a pixel in projection images cumulatively added to the same position in the tomographic image using a normalized cross-correlation.

The weighting coefficient calculator 146 calculates weighting coefficients that increases with the similarity for the pixels of the tomographic image.

The multiplication processor 148 multiplies the pixel values of the pixels of the tomographic image by a corresponding weighting coefficients to produce a multiplication-processed image after the multiplication processing. The multiplication-processed image is displayed on the monitor 32.

After the reconstruction of the tomographic image, the image processor 28B weights the pixel value of the pixel in the tomographic image according to the similarity between the given regions near the pixel in the individual projection images cumulatively added to the same position in the tomographic image to selectively enhance a structure of interest in a focused cross section (lessen a structure in cross sections other than the focused cross section).

In the image processor 28B, the pixel value Tz(x,y) of the pixels of the reconstructed tomographic image Tz is expressed by the following formula where wi(x,y) are the weighting coefficients for the pixels Tz(x,y) in the reconstructed tomographic image Tz.

$$Tz(x, y) = wi(x, y) * \sum_{i=-I}^{I} Pi(ti, si)$$

The image processor 28B calculates the weighting coefficients wi(x,y) as follows.

First, the similarity calculator 144 calculates the similarity between the rectangular regions near the projection positions Pi(ti,si) of the pixel in the projection images Pi cumulatively added to the same position in the tomographic image Tz based on an average of the normalized cross-correlation between two images among a plurality of images.

The weighting coefficient calculator 146 calculates weighting coefficients wi(x,y) that increases with the similarity for the pixels of the tomographic image Tz.

Weighting with the weighting coefficients wi has an effect of changing the pixel value Tz(x,y) according to the similarity between the corresponding rectangular regions of the projection images Pi cumulatively added to the pixel value Tz(x,y) of the pixels of the tomographic image Tz. This makes it possible to enhance a structure of interest and prevent occurrence of an artifact due to an effect of another structure than the structure of interest in the reconstructed tomographic image Tz with reduced amount of calculation.

Likewise, the similarity calculator 144 may be adapted to calculate the similarity between pixels at the projection position Pi(ti,si) in the projection images Pi cumulatively added to the same position in the tomographic image Tz. The similarity calculator 144 may calculate the similarity between given regions or pixels of two projection images not only from the normalized cross-correlation but by any of various template matching (pattern matching) methods.

Next, the radiographic imaging system according to a third aspect of the invention will be described.

The configuration of the radiographic imaging system according to the third aspect of the invention is the same as that of the radiographic imaging system according to the first and the second aspect. The radiographic imaging system 10 according to the third aspect of the invention comprises the imaging apparatus 12 and the console 14. The operation in tomosynthesis imaging of the radiographic imaging system 10 according to the third aspect is the same as that of the radiographic imaging system 10 according to the first and the second aspect and, therefore, is not described.

Next, the image processing for reconstructing a tomographic image performed in the image processor 28 is described.

Figure 8:
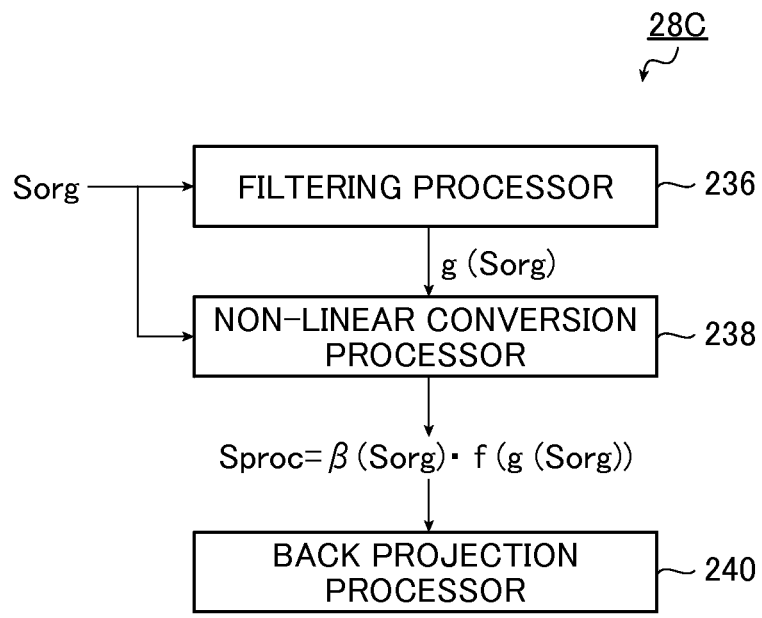
FIG. 8 is a block diagram of a first embodiment representing a configuration of a radiographic imaging system according to the third aspect.

FIG. 8 is a block diagram of a first embodiment representing a configuration of an image processor of a radiographic imaging system according to the third aspect. An image processor 28C illustrated in that figure comprises a filtering processor 236, a non-linear conversion processor 238, and a back projection processor 240.

The filtering processor 236 uses a filter to perform image processing such as, for example, frequency enhancement processing and frequency suppression processing, of projection signals Sorg corresponding to the projection images and produce filtering-processed image signals g(Sorg) corresponding to the filtering-processed images.

The non-linear conversion processor 238 performs contrast-dependent and transit dose-dependent non-linear conversion of the filtering-processed image signals g(Sorg). The non-linear conversion processor 238 outputs a converted image signal Sproc corresponding to a converted image obtained after the filtering-processed image signals g(Sorg) undergo the non-linear conversion.

As described earlier, an image signal corresponding to a portion, which is in itself of a high-contrast such as a metal, may be excessively enhanced by the above image processing. In such a case, there may occur an overshoot or undershoot in the filtering-processed image signals g(Sorg) between pixels of a high-contrast portion corresponding to, for example, a metal and the periphery thereof in the filtering-processed image, possibly resulting in generation of an artifact in a corresponding portion of the reconstructed tomographic image.

The contrast-dependent non-linear conversion processing non-linearly converts the filtering-processed image signals g(Sorg) so as to reduce the component of the filtering-processed image signals g(Sorg) contained in the converted image signals Sproc exceeding a given value, i.e., so as to prevent generation of an overshoot or an undershoot, when the filtering-processed image signals g(Sorg) exceed a given value, that is, when an overshoot or undershoot occurs in the filtering-processed image signals g(Sorg) between pixels of a high-contrast portion and the periphery thereof in the filtering-processed image.

In radiography, when, for example, the subject 34 is thick, the transit dose of the radiation decreases, and the projection image signals Sorg decrease, while the noise component contained in the projection image increases. Conversely, when the subject 34 is thin, the transit dose increases, and the projection image signals Sorg increase, while the noise component contained in the projection image decreases. In other words, when the thickness of the subject 34 is equal, the transit dose decreases as the amount of emitted radiation decreases, resulting in an increased noise component, while the transit dose increases as the amount of emitted radiation increases, resulting in a reduced noise component.

The transit dose-dependent non-linear conversion non-linearly converts the filtering-processed image signals g(Sorg) so as to reduce the filtering-processed image signal g(Sorg) component contained in the converted image signals Sproc, i.e., so as to reduce the noise component contained in the pixels of the converted image, when the transit dose corresponding to the pixels of the projection images is smaller than a given value, that is, when the projection image signals Sorg are small and the noise components contained in the pixels of the projection images are great.

As described above, the non-linear conversion processor 238 according to this embodiment performs contrast-dependent and transit dose-dependent non-linear conversion. The processing performed by the non-linear conversion processor 238 is shown by the following formula:

$$Sproc = \beta(Sorg) \cdot f(g(Sorg))$$

where g is a function for performing image processing such as frequency enhancement and frequency suppression, f a function for performing contrast-dependent non-linear conversion, and β a function for performing transit-dependent non-linear conversion.

It is not essential that the non-linear conversion processor 238 performs transit dose-dependent non-linear conversion; it may perform only contrast-dependent non-linear conversion.

The filtering processor 236 and the non-linear conversion processor 238 constitute the filter correction processor for performing filter correction. Thus, the filter correction processor performs filter correction wherein the filtering processor 236 performs image processing of the projection image signals Sorg to produce the filtering-processed image signals g(Sorg) and the non-linear conversion processor 238 performs non-linear conversion of the filtering-processed image signals g(Sorg) to produce the converted image signal Sproc.

Lastly, the back projection processor 240 reconstructs a tomographic image in a cross section at a given height of the subject 34 from the converted image signals Sproc of converted images corresponding to the filter-corrected projection images.

Now, the operation of the image processor 28C is described.

In the image processor 28C, the filtering processor 236, for example, first converts the projection image signal Sorg into a frequency image signal composed of a plurality of frequency components through Fourier transform. Next, the frequency image signal undergoes image processing through a filter for enhancing high-frequency components as illustrated in FIG. 17A, for example, followed by inverse Fourier transform, producing the filtering-processed image signals g(Sorg) corresponding to the filtering-processed images.

Figure 17A:
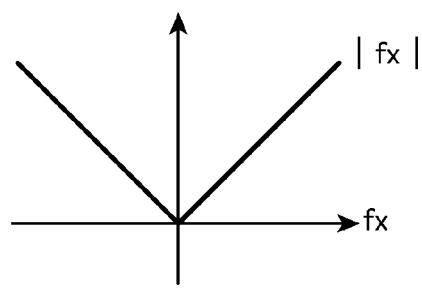
FIGS. 17A and 17B are graphs of examples representing filtering characteristics in non-linear conversion.
Figure 17B:
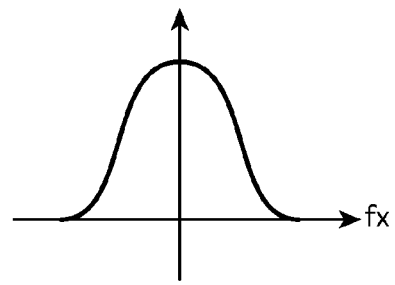

The filter for enhancing high frequency components of the projection images is not limited to that illustrated in FIG. 17A; any filter as appropriate capable of like function may be used. The filtering processor 236 may be one that suppresses low frequency components of the projection images.

Next, the non-linear conversion processor 238 performs contrast-dependent and transit dose-dependent non-linear conversion of the filtering-processed image signals g(Sorg).

Figure 9:
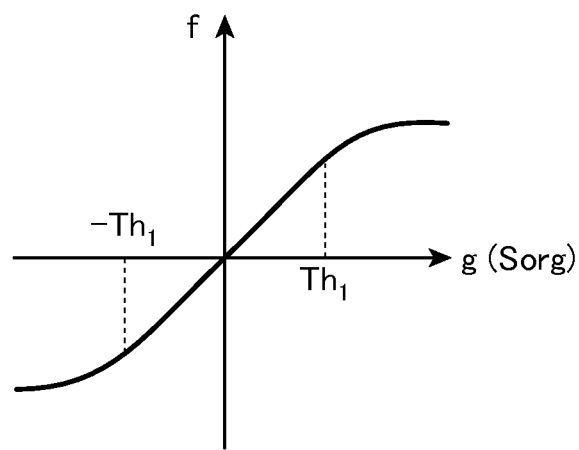
FIG. 9 is a graph of an example representing filtering characteristics in non-linear conversion.

As illustrated in the graph of FIG. 9, for example, when the absolute value of the filtering-processed image signals g(Sorg) exceeds a given value Th1, the filtering-processed image signals g(Sorg) undergo contrast-dependent non-linear conversion according to non-linear conversion characteristics in which conversion coefficients for a portion of the filtering-processed image signals g(Sorg) contained in the converted image signals Sproc exceeding the given value is smaller than conversion coefficients for a portion of the filtering-processed image signals g(Sorg) not exceeding the given value by the function f. While FIG. 9 only shows a case where the filtering-processed image signals g(Sorg) have a ±value, the filtering-processed image signals g(Sorg) need not necessarily have a ±value.

When the transit dose corresponding to the pixels of the projection images is smaller than a given value, the non-linear conversion is performed so as to reduce the filtering-processed image signal g(Sorg) component contained in the converted image signals Sproc.

As described above, through filter correction combining the image processing by the filtering processor 236 with the non-linear conversion by the non-linear conversion processor 238 of the projection image signals Sorg, the converted image signal Sproc is produced.

Thus, the chances of an artifact occurring in a reconstructed tomographic image as a result of, for example, a high-contrast portion such as a metal being excessively enhanced, and a noise component being enhanced, can be reduced without increasing computation time.

The above filter correction is sequentially performed for the projection image signals Sorg corresponding to all the projection images, followed by storage in the recorder 30. Thus, following the filter correction of the projection image signals Sorg corresponding to all the projection images and the production of the converted image signals Sproc, the back projection processor 240 reconstructs a tomographic image in a cross section at a given height of the subject 34 from the converted image signals Sproc of converted images corresponding to the filter-corrected projection images. The reconstructed image is displayed on the monitor 32.

Figure 10:
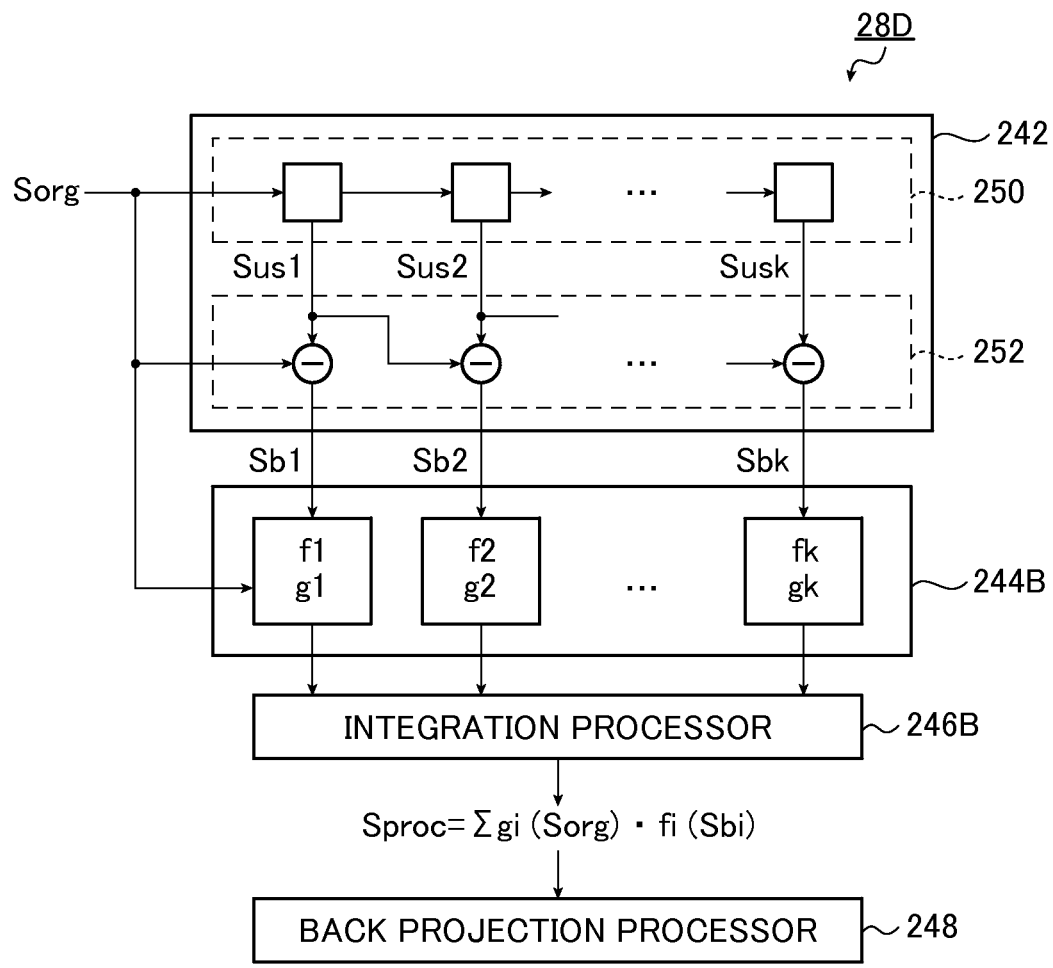
FIG. 10 is a block diagram of a second embodiment representing a configuration of an image processor of a radiographic imaging system according to the third aspect.

Next, FIG. 10 is a block diagram of a second embodiment representing a configuration of an image processor of a radiographic imaging system according to the third aspect. An image processor 28D illustrated in that figure comprises a frequency filtering processor 242, a non-linear conversion processor 244B, an integration processor 246B, and a back projection processor 248.

Through frequency filtering processing, the frequency filtering processor 242 produces band limiting image signals Sbi (i=1 to k, where k is an integer greater than 1) corresponding to band limiting images having different frequency response characteristics from the projection image signals Sorg corresponding to the projection images. As illustrated in that figure, the frequency filtering processor 242 comprises an unsharp mask image signal producer 250 and a band limiting image signal producer 252.

From the projection image signals Sorg, the unsharp mask image signal producer 250 produces unsharp mask image signals Susi (i=1 to k, where k is an integer greater than 1) corresponding to unsharp mask images, which are mean images of the projection images and have different frequency response characteristics. According to this embodiment, an unsharp mask image signal Sus1 is on the high-frequency side and an unsharp mask image signal Susk is on the low-frequency side.

From the projection image signals Sorg and the unsharp mask image signals Susi, the band limiting image signal producer 252 produces band limiting image signals Sbi corresponding to band limiting images having different frequency response characteristics. The band limiting images are differential images between two images adjacent to each other in frequency component (frequency band) among projection images and unsharp mask images.

The frequency filtering processor 242 produces band limiting image signals Sbi by band-limiting the projection image signals Sorg one-dimensionally along the radiation source movement direction. Band limitation perpendicular to the radiation source movement direction is not necessary but may be effected.

Subsequently, the non-linear conversion processor 244B performs contrast-dependent non-linear conversion (fi (i=1 to k, where k is an integer greater than 1)) of the band limiting image signals Sbi.

Figure 11:
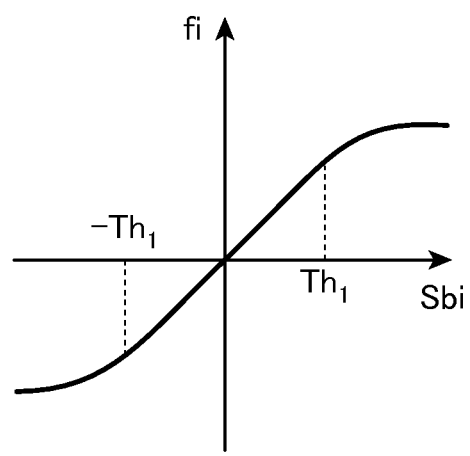
FIG. 11 is a graph of an example representing filtering characteristics in non-linear conversion.

The pixels undergo the contrast-dependent non-linear conversion for suppressing the contrast when the band limiting image signals Sbi exceed a given value as illustrated in FIG. 11. Thus, an excessively high contrast of the band limiting image signals Sbi is prevented, and occurrences of an overshoot and an undershoot are suppressed.

In addition to the contrast-dependent non-linear conversion, the non-linear conversion processor 244B performs transit dose-dependent non-linear conversion (gi (i=1 to k, where k is an integer greater than 1)) whereby each band limiting image signal Sbi is multiplied by a gain gi(Sorg) that is dependent on the projection image signal Sorg. The gain gi has a functional shape for applying a small gain when the projection image signal Sorg is smaller than a given value. This produces an effect acting to suppress the contrast of the noise component in pixels having a small transit dose and hence a great noise component and thus prevents the noise from increasing. This also produces an effect acting to suppress the contrast due to a high absorbent such as a metal.

Next, the integration processor 246B adds up the band limiting image signals Sbi outputted from the non-linear conversion processor 244B to produce the converted image signals Sproc. The converted image signals Sproc may be expressed by the following formula.

$$Sproc = \Sigma gi(Sorg) \cdot fi(Sbi)$$

gi is a non-linear function defining the gain that is dependent on the projection image signal Sorg; fi is a function defining the contrast-dependent non-linear conversion.

The frequency filtering processor 242, the non-linear conversion processor 244B, and the integration processor 246B constitute the filter correction processor for performing filter correction. Thus, the filter correction processor performs filter correction wherein the frequency filtering processor 242 produces the band limiting image signals Sbi from the projection image signals Sorg, the non-linear conversion processor 244B performs non-linear conversion of the band limiting image signals Sbi, and the integration processor 246B adds up the non-linearly converted band limiting image signals Sbi, to produce the converted image signals Sproc.

The back projection processor 248 reconstructs a tomographic image in a cross section at a given height of the subject 34 from the converted image signals Sproc of converted images corresponding to the filter-corrected projection images.

Now, the operation of the image processor 28D is described.

In the image processor 28D, the frequency filtering processor 242 performs the following frequency filtering of the projection image signals Sorg corresponding to the projection images.

First, from the projection image signals Sorg, the unsharp mask image signal producer 250 produces unsharp mask image signals Susi corresponding to unsharp mask images having different frequency response characteristics.

For example, the unsharp mask image signal producer 250 performs filtering of the projection image signals Sorg of all the pixels forming the whole projection image with an unsharp mask to produce the unsharp mask image signal Sus1. Repeated filtering of the filtering-processed unsharp mask image signals Susi yields unsharp mask image signals Sus1, Sus2, Sus3, Susk having different frequency response characteristics.

Then, from the projection image signals Sorg and the unsharp mask image signals Susi, the band limiting image signal producer 252 produces band limiting image signals Sbi corresponding to band limiting images having a plurality of frequency components.

For example, the band limiting image signal producer 252 uses a subtracter to subtract the unsharp mask image signal Sus1 from the projection image signal Sorg and produce the band limiting image signal Sb1. Likewise, subtraction of one unsharp mask image signal from another having an adjacent frequency component to each other, Sus1−Sus2, Sus2−Sus3, Sus3−Sus4, . . . , Sus (k−1)−Susk, is performed to produce band limiting image signals Sb1, Sb2, Sb3, . . . , Sbk corresponding to the band limiting images having a plurality of frequency components.

Thus, the band limiting image signals Sbk each contain only a frequency component of a band-limited image limited to a given frequency band.

Subsequently, the non-linear conversion processor 244B performs contrast-dependent non-linear conversion of the band limiting image signals Sbi.

When the absolute value of the band limiting image signals Sbi exceeds a given value as illustrated in FIG. 11, the non-linear conversion processor 244B performs conversion of the pixels whereby the contrast of the band limiting image signals Sbi is suppressed so that the component of the band limiting image signals Sbi contained in the converted image signals Sproc exceeding the given value decreases according to the function fi. FIG. 11 shows a case where the band limiting image signals Sbi have a ±value.

In addition to the contrast-dependent non-linear conversion, the non-linear conversion processor 244B multiplies each band limiting image signal Sbi by the gain gi(Sorg) that is dependent on the projection image signal Sorg so that the band limiting image signals of the pixels contained in the converted image signals Sproc having a projection image signal smaller than a give value decreases according to the function gi. The non-linear conversion processor 244B outputs non-linearly converted band limiting image signals Sbi.

Next, the integration processor 246B adds up the band limiting image signals Sbi outputted from the non-linear conversion processor 244B to produce the converted image signals Sproc corresponding to the converted images.

As described above, filter correction of the band limiting image signals Sbi produced by the frequency filtering processor 242, including both the non-linear conversion by the non-linear conversion processor 244B and the integration processing by the integration processor 246B, yields the converted image signals Sproc.

This results in suppression of occurrence of an artifact in a tomographic image resulting from an excessive enhancement of an area that is in itself of a high contrast such as a metal or an enhanced noise component.

The above filter correction is sequentially performed on the projection image signals Sorg corresponding to all the projection images, followed by storage in the recorder 30. Thus, when the projection image signals Sorg corresponding to all the projection images undergo the above filter correction and the converted image signals Sproc are produced, the back projection processor 248 reconstructs a tomographic image in a cross section at a given height of the subject from the converted image signals Sproc of converted images corresponding to the filter-corrected projection images. The reconstructed image is displayed on the monitor 32.

Figure 12:
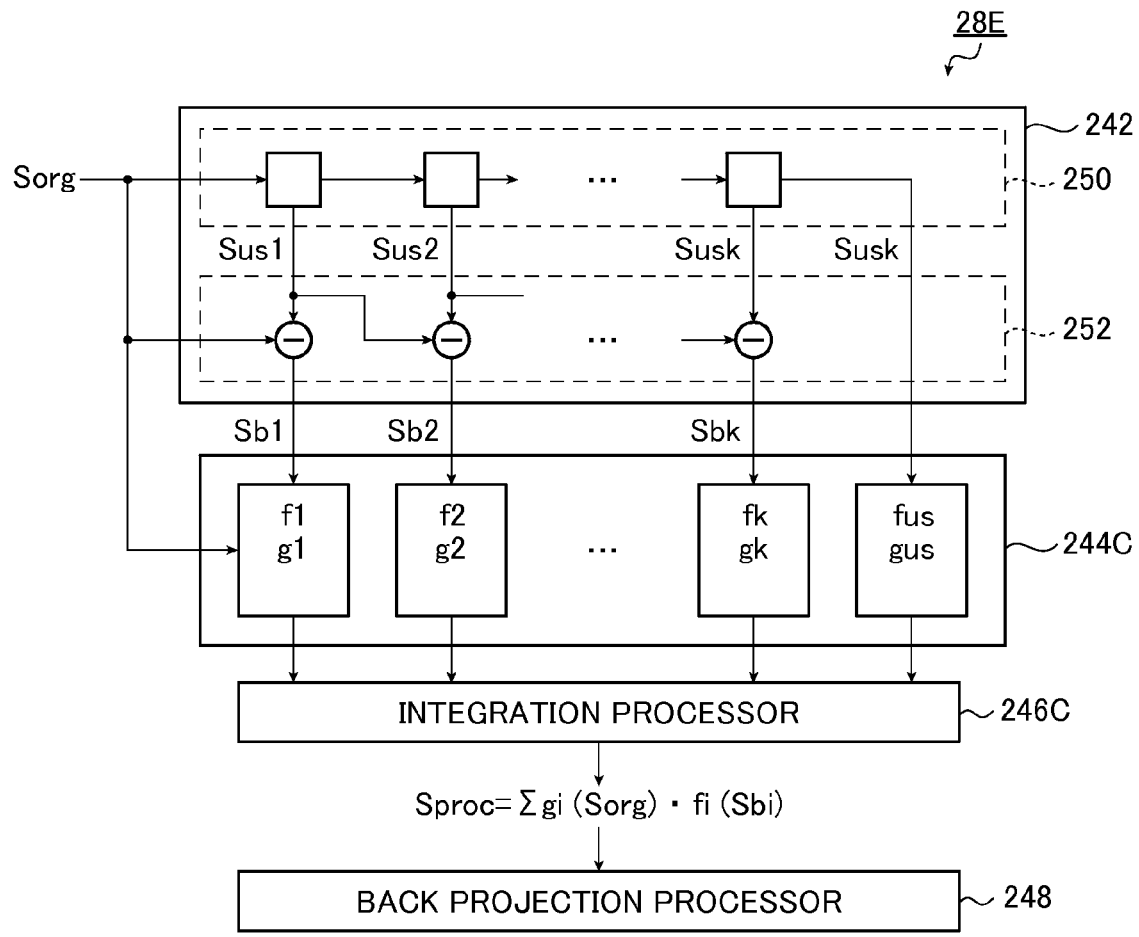
FIG. 12 is a block diagram of a third embodiment representing a configuration of an image processor of a radiographic imaging system according to the third aspect.

Next, FIG. 12 is a block diagram of a third embodiment representing a configuration of an image processor of a radiographic imaging system according to the third aspect. Like the image processor 28D illustrated in FIG. 10, an image processor 28E illustrated in FIG. 12 comprises the frequency filtering processor 242, a non-linear conversion processor 244C, an integration processor 246C, and the back projection processor 248. The differences between the image processors 28E and 28D lie in the non-linear conversion processor 244C and the integration processor 246C. These units will therefore be mainly described below.

Like the non-linear conversion processor 244B, the non-linear conversion processor 244C performs contrast-dependent non-linear conversion of the band limiting image signals Sbi. In addition to the contrast-dependent non-linear conversion, the non-linear conversion processor 244C performs transit dose-dependent non-linear conversion whereby each band limiting image signal Sbi is multiplied by a gain gi(Sorg) that is dependent on the projection image signal Sorg.

As illustrated in FIG. 12, the non-linear conversion processor 244C performs filter correction also of an unsharp mask image signal (unsharp mask image signal on the lowermost side) Susk outputted from the last stage of the unsharp mask image signal producer 250 according to functions fus and gus but this is not essential.

Next, the integration processor 246C adds up the band limiting image signals Sbi outputted from the non-linear conversion processor 244C to produce the converted image signals Sproc corresponding to the converted images having undergone the integration processing. The converted image signal Sproc may be expressed by the following formula.

$$Sproc = \Sigma gi(Sorg) \cdot fi(Sbi)$$

where gi is a non-linear function defining the gain that is dependent on the projection image signal Sorg; fi is a function defining the contrast-dependent non-linear conversion.

Likewise, the frequency filtering processor 242, the non-linear conversion processor 244C, and the integration processor 246C constitute the filter correction processor for performing filter correction. Thus, the filter correction processor performs filter correction wherein the frequency filtering processor 242 produces the band limiting image signals Sbi from the projection image signals Sorg, the non-linear conversion processor 244C performs non-linear conversion of the band limiting image signals Sbi, and the integration processor 246C adds up the non-linearly converted band limiting image signals Sbi, to produce the converted image signals Sproc.

Now, the operation of the image processor 28E is described.

The operation of the frequency filtering processor 242 performed until the production of the band limiting image signals Sb1, Sb2, Sb3, . . . , Sbk corresponding to the band limiting images having a plurality of frequency components is the same as with the image processor 28D.

Subsequently, the non-linear conversion processor 244C performs contrast-dependent non-linear conversion and the transit dose-dependent non-linear conversion of the band limiting image signals Sbi.

Figure 13:
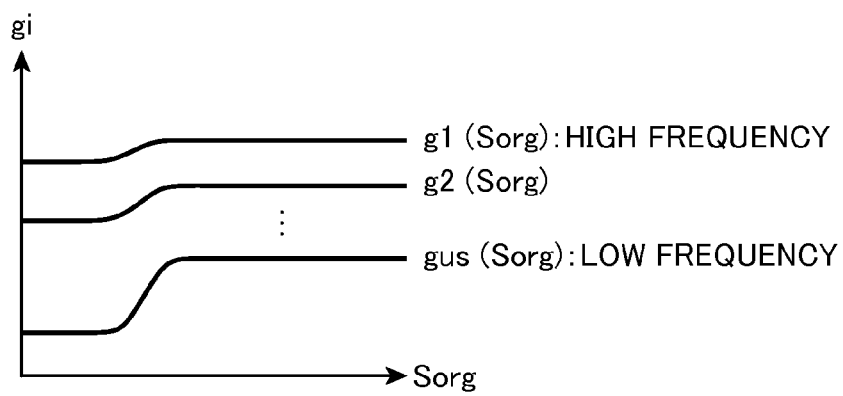
FIG. 13 is a graph of an example representing filtering characteristics in non-linear conversion.

The non-linear conversion processor 244C performs non-linear conversion whereby as illustrated in FIG. 13 each band limiting image signal Sbi is multiplied by the gain gi(Sorg) that is dependent on the projection image signal Sorg for pixels where the projection image signal Sorg is smaller than a given value, i.e., pixels that greatly absorb radiation and have a high luminosity (low density), so that the band limiting image signal Sbi component contained in the converted image signals Sproc decreases according to the function gi. Specifically, the non-linear conversion processing is performed on pixels, where the projection image signal Sorg is smaller than a given value, so that the band limiting image signal Sbi component contained in the converted image signals Sproc grows increasingly smaller from the higher frequency component of the projection image signal Sorg to the lower frequency component.

Thus, providing the pixels having the projection image signal Sorg smaller than a given value with characteristics of suppressing, in particular, a low frequency component produces an effect acting to suppress a contrast attributable, for example, to a metal having a great absorbency and reduces artifacts occurring in a reconstructed image.

Figure 14:
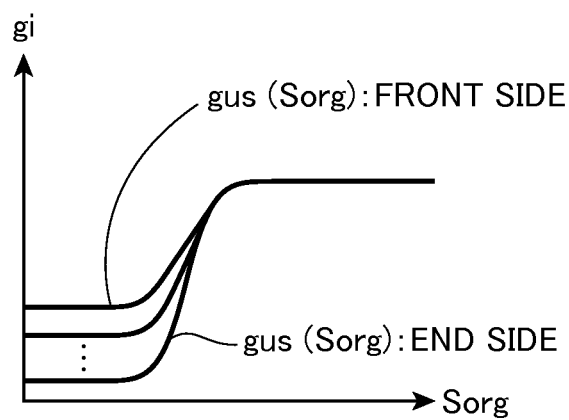
FIG. 14 is a graph of an example representing filtering characteristics in non-linear conversion.

As illustrated in FIG. 14, for pixels where the projection image signal Sorg is smaller than a given value, a non-linear conversion whereby each of the band limiting image signal Sbi is multiplied by the gain gi(Sorg) that is dependent on the projection image signal Sorg may be performed, so that the component of the band limiting image signal Sbi contained in the converted image signals Sproc decreases as the imaging angle increases from an imaging angle 0, where the subject 34 is imaged from the front thereof, to an imaging angle, where the subject 34 is imaged from a position closer to an end (where, therefore, the imaging angle is great) according to the function gi.

Figure 15:
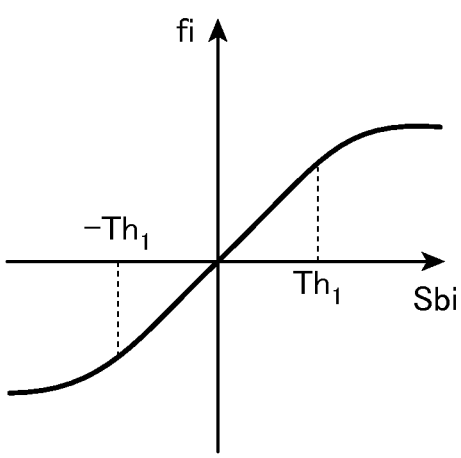
FIG. 15 is a graph of an example representing filtering characteristics in non-linear conversion.

When the absolute value of the band limiting image signals Sbi exceeds the given value Th1 as illustrated in FIG. 15, the non-linear conversion processor 244C performs conversion of the band limiting image signals Sbi for the pixels to suppress the contrast, so that the component of the band limiting image signals Sbi contained in the converted image signals Sproc exceeding the given value Th1 decreases according to the function f1. FIG. 15 shows a case where the band limiting image signals Sbi have a ±value. The non-linear conversion processor 244C outputs non-linearly converted band limiting image signals Sbi.

Alternatively, the non-linear conversion may be performed so as to make increasingly gentler the slope of the conversion curve of the function f1 for non-linearly converting the band limiting image signals Sbi, that is, to reduce the band limiting image signals Sbi according to the function f1 as the imaging position moves from where the subject 34 is imaged from the front thereof to the position closer to the end.

Next, the integration processor 246C adds up the band limiting image signals Sbi outputted from the non-linear conversion processor 244C to produce the converted image signals Sproc corresponding to the converted images. The operation to follow is the same as with the image processor 28D.

As described above, filter correction of the band limiting image signals Sbi produced by the frequency filtering processor 242, including both the non-linear conversion by the non-linear conversion processor 244C and the integration processing by the integration processor 246C, yields the converted image signals Sproc.

This minimizes excessive enhancement of a high-contrast portion such as a metal in a reconstructed tomographic image and, therefore, reduces the chances of occurrences of artifacts and enhancement of a noise component.

As described in JP 3816151 B, unsharp mask image signals Susi having different frequency response characteristics may be produced by sequentially thinning out the pixels of the projection images to produce unsharp mask images having different resolutions.

Figure 16:
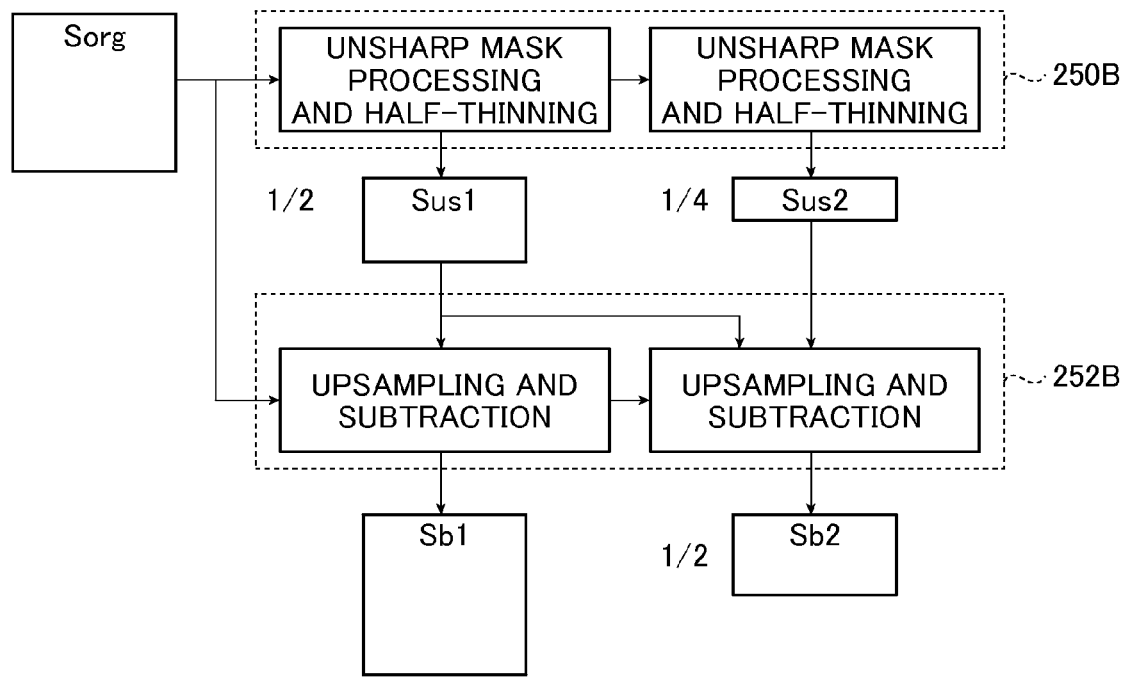
FIG. 16 is a block diagram of an example representing a configuration of a frequency filtering processor.

According to this method, as illustrated in FIG. 16, an unsharp mask image signal producer 250B performs unsharp mask image processing of the projection image signals Sorg while repeatedly thinning out pixels of projection images sequentially in the vertical direction as seen in the drawing (in the radiation source movement direction) to half a number to produce unsharp mask images (Gaussian pyramid) having different sizes (resolutions). The above process yields unsharp mask image signals Sus1, Sus2, Sus3, . . . , Susk corresponding to unsharp mask images each having a size of a half, a fourth, and an eighth of the vertical size of the projection images and the same horizontal size as the projection images.

As illustrated in that figure, the unsharp mask images have different vertical sizes. Thus, a band limiting image signal producer 252B following the unsharp mask image signal producer 250B cannot perform subtraction between the image signal Sorg of the projection images and the image signal Sus1 of the unsharp mask image adjacent thereto and subtraction between image signals of unsharp mask images having adjacent frequency components, i.e., Sorg−Sus1, Sus1−Sus2, Sus2−Sus3, Sus3−Sus4, . . . , Sus(k−1)−Susk.

Therefore, the band limiting image signal producer 252B first interpolates the vertical size of the unsharp mask images by upsampling by a factor of two before performing subtraction between the image signal Sorg of the projection images and the image signal Sus1 of the unsharp mask image signal adjacent thereto and subtraction between image signals of unsharp mask images having adjacent frequency components, i.e., Sorg−Sus1, Sus1−Sus2, Sus2−Sus3, Sus3−Sus4, . . . , Sus(k−1)−Susk to produce band limiting image signals Sb1, Sb2, Sb3, . . . , Sbk corresponding to the band limiting images having a plurality of frequency components.

Further, as illustrated in that figure, the band limiting images having undergone the subtraction also have different vertical sizes. Therefore, like the band limiting image signal producer 252B, the integration processor 246B, not shown in FIG. 16, interpolates the vertical size of the band limiting image by upsampling by a factor of two before adding up the converted image signals to produce the converted image signals Sproc.

The thinning of the pixels may be done not only in the image's vertical direction but in the horizontal to produce unsharp mask images having different resolutions.

While the radiographic imaging system according to the embodiment described above acquires projection images of a subject in tomosynthesis as the radiation source moves along a linear track, the present invention is not limited thereto and may be applied to, for example, a radiographic imaging system achieving tomosynthesis imaging with the radiation source moved on a track other than a linear track, such as a circular track with a subject at its center, to acquire projection images of the subject. Application of the invention to such case is made possible by changing the formula for calculating the corresponding pixels to suit the imaging geometry.

While the radiographic imaging system according to the above embodiment reconstructs a tomographic image in a given cross section of a subject by the shift-and-add method, the present invention is not limited thereto and may be applied to other radiographic imaging systems that achieve reconstruction of a tomographic image by a method other than the shift-and-add method such as a radiographic imaging system that reconstructs a tomographic image by, for example, adding up the corresponding pixels by filtered back-projection method. For example, where the reconstruction of a tomographic image is achieved by filtered back-projection method, the invention may be applied using projection images having undergone the filtering processing.

Further, the radiographic imaging system according to the first or the second aspect may be used in combination with the radiographic imaging system of one of the first to the third embodiment according to the third aspect. That is, converted image signals Sproc corresponding to respective converted images produced by the radiographic imaging system according to the third aspect may be supplied instead of projection image signals corresponding to the projection images acquired by tomographic imaging to the radiographic imaging system according to the first or the second aspect to reconstruct a tomographic image from converted images.

In this case, the converted image signals Sproc corresponding to the converted images having undergone non-linear conversion processing produced by the non-linear conversion processor 238 of the radiographic imaging system of the first embodiment according to the third aspect or the converted image signals Sproc corresponding to the converted images having undergone integration processing produced by the integration processor 246B of the second embodiment or the integration processor 246C of the third embodiment according to the third aspect are supplied to the similarity calculator 136 of the radiographic imaging system according to the first aspect or the back projection processor 142 of the radiographic imaging system according to the second aspect.

Thus, both the effects produced by the radiographic imaging system according to the third aspect and the radiographic imaging system according to the first and the second aspect can be obtained. Specifically, occurrence of an artifact resulting from an excessive enhancement of an area that is in itself of a high contrast such as an area containing a metal and enhancement of a noise component in a reconstructed tomographic image can be suppressed without increasing the computation time. Further, a structure of interest can be enhanced while occurrence of an artifact due to an effect of another structure than the structure of interest in a reconstructed tomographic image can be prevented.

The present invention is basically as described above.

The present invention described above in detail is not limited in any manner to the above embodiments, and various improvements and modifications may be made without departing from the spirit of the invention.

I claim:

1. A radiographic imaging system for reconstructing a tomographic image in a given cross section of a subject from projection images of a subject acquired in tomosynthesis imaging, the radiographic imaging system comprising,
    a frequency filtering processor for producing band limiting image signals having different frequency response characteristics from projection image signals corresponding to the projection images;
    a non-linear conversion processor for performing non-linear conversion of the band limiting image signals according to non-linear conversion characteristics in which conversion coefficients for a portion of the band limiting image signals exceeding a first given value is smaller than conversion coefficients for a portion of the band limiting image signals not exceeding the first given value;
    an integration processor for adding up the band limiting image signals having undergone non-linear conversion through the non-linear conversion processor to produce converted image signals;
    a back projection processor for reconstructing the tomographic image in the given cross section of the subject from the converted image signals corresponding to the projection images;
    a similarity calculator for calculating a similarity between a pixel of a reference converted image and each of pixels of the converted images cumulatively added to a same position in the tomographic image using one converted image corresponding to one converted image signal as the reference converted image; and
    a weighting coefficient calculator for calculating weighting coefficients that increase with the similarity for each of the pixels of the converted images;
    wherein the back projection processor is adapted to cumulatively add up products of the pixel values of the pixels of the converted images cumulatively added to the same position in the tomographic image and the corresponding weighting coefficients to reconstruct the tomographic image.

2. The radiographic imaging system according to claim 1, wherein the similarity calculator is adapted to calculate a similarity between a first region of the reference converted image and a second region of the converted images cumulatively added to the same position in the tomographic image.

3. The radiographic imaging system according to claim 1, wherein the similarity calculator is adapted to use as the reference converted image a converted image acquired from a front of the subject among the converted images.

4. A radiographic imaging system for reconstructing a tomographic image in a given cross section of a subject from projection images of a subject acquired in tomosynthesis imaging, the radiographic imaging system comprising:
    a frequency filtering processor for producing band limiting image signals having different frequency response characteristics from projection image signals corresponding to the projection images;
    a non-linear conversion processor for performing non-linear conversion of the band limiting image signals according to non-linear conversion characteristics in which conversion coefficients for a portion of the band limiting image signals exceeding a first given value is smaller than conversion coefficients for a portion of the band limiting image signals not exceeding the first given value;
    an integration processor for adding up the band limiting image signals having undergone non-linear conversion through the non-linear conversion processor to produce converted image signals;
    a back projection processor for reconstructing the tomographic image in the given cross section of the subject from the converted image signals corresponding to the projection images;
    wherein the back projection processor is adapted to reconstruct the tomographic image from the converted images,
    the radiographic imaging system further comprising:
    a similarity calculator for calculating a similarity between pixels of the converted images cumulatively added to a same position in the tomographic image;
    a weighting coefficient calculator for calculating weighting coefficients that increase with the similarity for each of the pixels of the tomographic image; and
    a multiplication processor for multiplying pixel values of the pixels of the tomographic image by corresponding weighting coefficients to produce a multiplication-processed image.

5. The radiographic imaging system according to claim 4, wherein the similarity calculator is adapted to calculate a similarity between given regions of the converted images cumulatively added to the same position in the tomographic image.

6. The radiographic imaging system according to claim 1, wherein the similarity calculator is adapted to calculate the similarity by normalized cross correlation.

7. The radiographic imaging system according to claim 1, wherein the weighting coefficient calculator is adapted to use the similarity as the weighting coefficients.

8. A radiographic imaging system for reconstructing a tomographic image in a given cross section of a subject comprising:
    a radiation detector for acquiring a plurality of projection images of the subject taken at discrete different angles of radiation in tomosynthesis imaging and for outputting a plurality of projection-image signals corresponding to the plurality of projection-images;

a frequency filtering processor for producing a plurality of band-limited image signals having different frequency bands from each projection-image signal of the plurality of projection-image signals;

a non-linear conversion processor for performing a first non-linear conversion of the band-limited image signals of each projection-image signal according to multiplying first non-linear conversion coefficients to each value of the band-limited image signals, wherein the first non-linear conversion coefficients for each value exceeding a first given value in each band-limited image signal of the plurality of band-limited image signals is smaller than each value not exceeding the first given value of the band-limited image signal;

an integration processor to produce a converted image signal corresponding to each projection-image signal, by adding up each band-limited image signal transformed by the non-linear conversion processor; and a back projection processor for reconstructing the tomographic image in the given cross section of the subject from the plurality of converted image signals corresponding to the projection-images.

9. The radiographic imaging system according to claim 4, wherein the non-linear conversion processor further performs a second non-linear conversion which multiplies second non-linear conversion coefficients with the values of each band-limited image signal transformed by the first non-linear conversion, and the second non-linear conversion coefficients have non-linear relations to values of the projection-image signal.

10. The radiographic imaging system according to claim 9, wherein the second non-linear conversion coefficients for projection-image signal values less than a second given value are smaller than for values of the projection-image signal more than the second given value.

11. The radiographic imaging system according to claim 9, wherein the second non-linear conversion coefficients, at the same values of each projection-image signal, grow increasingly smaller from a higher-frequency band-limited image signal to a lower-frequency band-limited image signal.

12. The radiographic imaging system according to claim 9, wherein the second non-linear conversion coefficients, at values less than a third given value of each projection-image signal, grow increasingly smaller from a projection image acquired from a front of the subject to a projection image acquired from ends of the subject.

13. The radiographic imaging system according to claim 10, wherein the second non-linear conversion coefficients, at the same values of each projection-image signal, grow increasingly smaller from a higher-frequency band-limited image signal to a lower-frequency band-limited image signal.

14. The radiographic imaging system according to claim 8, wherein the frequency filtering processor is adapted to produce the band-limited image signals by band-limiting the projection image signals one-dimensionally along a radiation source movement direction.

15. A radiographic imaging system for reconstructing a tomographic image in given cross section of a subject comprising:

a radiation detector for acquiring a plurality of projection images of subject taken at discrete different angles of radiation in tomosynthesis imaging and outputting a plurality of projection-image signals corresponding to the plurality of projection-images;

a filtering processor which converts each projection-image signal of the plurality of projection-image signals into each filtering-processed projection-image signal;

a non-linear conversion processor for performing a third non-linear conversion of the filtering-processed projection-image signal to produce each converted-image signal of a plurality of converted-image signals;

a back projection processor for reconstructing the tomographic image in the given cross section of the subject from the plurality of the converted-image signals;

wherein the filtering processor converts through Fourier-transform each projection image signal, of the plurality of projection-image signals, into each frequency image signal composed of a plurality of frequency components, enhances high-frequency components in each frequency image signal, and converts through inverse-Fourier-transform the each high frequency enhanced image signal into each filtering-processed projection-image signal; and wherein the non-linear conversion processor multiplies third non-linear conversion coefficients to each value of filtering-processed projection-image signal, and the third conversion coefficients for each value exceeding a fourth given value in each filtering-processed projection-image signal of the plurality of filtering-processed projection-image signals, corresponding to each projection-image signal, is smaller than the each value not exceeding the fourth given value of the filtering-processed projection-image signals.

16. The radiographic imaging system according to claim 15, wherein the non-linear conversion processor further performing a fourth non-linear conversion which multiplies fourth non-linear conversion coefficients to values of each filtering-processed projection-image signal transformed by the third non-linear conversion, and the fourth non-linear conversion coefficients have non-linear relations to values of the projection-image signal.

* * * * *